G. A. H. KELLNER.
LENS SYSTEM.
APPLICATION FILED FEB. 26, 1912.

1,197,742.

Patented Sept. 12, 1916.

Inventor
Gustav A. Hermann Kellner

Witnesses

UNITED STATES PATENT OFFICE.

GUSTAV A. H. KELLNER, OF ROCHESTER, NEW YORK, ASSIGNOR TO BAUSCH & LOMB OPTICAL COMPANY, OF ROCHESTER, NEW YORK, A CORPORATION OF NEW YORK.

LENS SYSTEM.

1,197,742.  Specification of Letters Patent. Patented Sept. 12, 1916.

Application filed February 26, 1912. Serial No. 679,865.

*To all whom it may concern:*

Be it known that I, GUSTAV A. H. KELLNER, of Rochester, in the county of Monroe and State of New York, have invented certain new and useful Improvements in Lens Systems; and I do hereby declare the following to be a full, clear, and exact description of the same, reference being had to the accompanying drawings, forming a part of this specification, and to the reference-numerals marked thereon.

My invention has for its object to provide a lens system for telescopes of that type known as Galilean telescopes, particularly those of low power, such as opera glasses, in which a field of view is provided that is larger than the field heretofore obtained in these instruments, the lenses, at the same time, being so constructed that they are corrected for curvature, astigmatism and distortion.

To these and other ends the invention consists in certain improvements and combinations of parts, all as will be hereinafter more fully described, the novel features being pointed out in the claims at the end of the specification.

Figure 1:
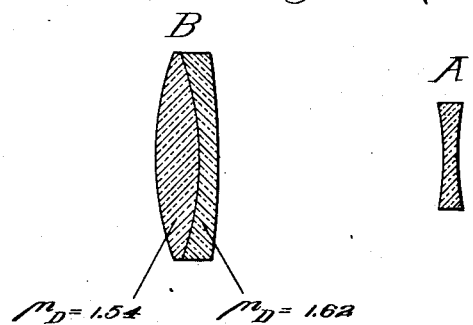
Figure 2:
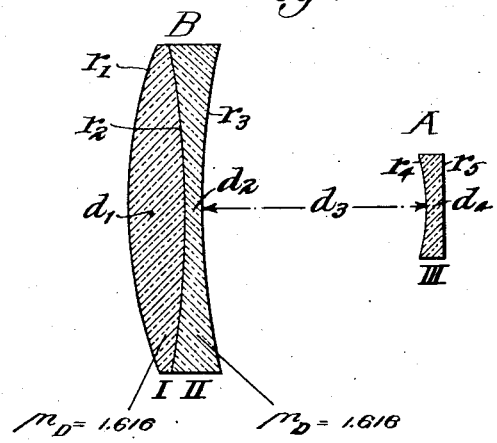

In the drawings: Figure 1 is a diagrammatic view of a lens system of the heretofore well known type, and prior art. Fig. 2 is a diagrammatic view illustrating the general appearance of the lens of a lens system constructed in accordance with my invention.

In the illustration I have shown in Fig. 1 the common and well known lens system employed in opera glasses, and commonly called the Galilean type of telescope, comprising the eyepiece lens A and the objective lens B. The objective usually applied to Galilean telescopes is a doublet or triplet in which the adjoining surfaces are of like curvature and in which, like in all telescope objectives of this type, the collective elements are made of crown glass, and the dispersive elements of flint glass. The crown glass ordinarily used for Galilean telescopes has a refractive index for the D line of about 1.54 and a ν of about 58, while the flint glass has a refractive index of 1.62 and a ν of 36.

If the powers of the collective and dispersive elements of the objective are in the right proportion the whole system (objective and eyepiece) will be achromatic and by varying the radii without changing the power of the component it is possible to correct for distortion. All other conditions being the same, the field of the Galilean telescope depends only upon the free diameter of the objective.

If the field of view obtained with a construction as described above, is kept under about eleven degrees for a power of "2", aberrations of oblique pencils: astigmatism, curvature of field, and distortion do not reach objectionable quantities. An attempt to increase the diameter of the objective and thereby gain in field proves a failure because the gain in field is made worthless by the rapid increase of aberrations near the margin of the field which becomes intolerable and completely spoils the definition in this part of the image. It can be shown that these aberrations can be removed by weakening the negative power of the surfaces at which the different components of the objective adjoin. This has to be done by reducing the difference between the refractive indices of the glasses, while the difference of the ν's is kept the same. It can be demonstrated that in this way, although the adjoining surfaces are no longer available for use in the correction of distortion, that the distortion can be corrected simultaneously with astigmatism and curvature of field by shaping the outside surfaces of objective and eyepiece properly.

The best results are obtainable with refractive indices essentially the same and not differing more than three per cent. from each other.

An example based upon the foregoing premises illustrating one embodiment of my invention and showing the kinds of glass, the thickness of the lenses, the curvatures and the distance between surfaces appears below and may be considered as applying to the lenses shown in Fig. 2.

*Kinds of glass.*

$n_{DI} = 1.6119$   $\nu_1 = 58.8$ mm.
$n_{DII} = 1.6113$   $\nu_2 = 37.1$ "
$n_{DIII} = 1.6181$   $\nu_3 = 36.5$ "

*Radii, thickness and distances.*

$r_1 = 35.0$ mm.   $d_1 = 7.5$ mm.
$r_2 = 150.0$ mm.   $d_2 = 1.5$ mm.
$r_3 = 86.9$ mm.   $d_3 = 32.7$ mm.
$r_4 = 27.8$ mm.   $d_4 = 1.0$ mm.
$r_5 = \infty$ A Galilean telescope constructed in accordance with my invention gives a well corrected field of view, which is at least 1.6 times the size of that given by the type of lenses ordinarily employed in opera glasses.

I claim as my invention:

1. A lens system for a Galilean type telescope composed of an objective and an eye piece, the forward surfaces of the objective and eye piece having powers respectively between two and four times the power of the objective, the power of the other surfaces being resultant according to diameter and magnification to correct the lens system for astigmatism, curvature of field and distortion.

2. A compound objective lens for a Galilean type telescope composed of elements of glass of different dispersive power and of substantially equal indices of refraction and provided with surfaces adapting said objective to coöperate with an eyepiece lens, said objective and eyepiece lens being so shaped as to provide a field corrected for chromatic aberration, astigmatism, curvature of field and distortion.

GUSTAV A. H. KELLNER.

Witnesses:
G. WILLARD RICH,
RUSSELL B. GRIFFITH.